United States Patent
Yano et al.

(10) Patent No.: US 9,862,203 B2
(45) Date of Patent: Jan. 9, 2018

(54) INK JET RECORDING METHOD AND INK JET RECORDING APPARATUS

(71) Applicant: Seiko Epson Corporation, Tokyo (JP)

(72) Inventors: Takeshi Yano, Shiojiri (JP); Ippei Okuda, Shiojiri (JP); Mitsuaki Kosaka, Minowa (JP)

(73) Assignee: Seiko Epson Corporation (JP)

( * ) Notice: Subject to any disclaimer, the term of this patent is extended or adjusted under 35 U.S.C. 154(b) by 209 days.

(21) Appl. No.: 15/053,507

(22) Filed: Feb. 25, 2016

(65) Prior Publication Data

US 2016/0250861 A1    Sep. 1, 2016

(30) Foreign Application Priority Data

Feb. 27, 2015 (JP) .................................. 2015-038292
Apr. 1, 2015 (JP) .................................. 2015-075129
Jul. 7, 2015 (JP) .................................. 2015-135870

(51) Int. Cl.
*B41J 2/21* (2006.01)
*B41M 5/00* (2006.01)
*B41M 7/00* (2006.01)
*C09D 11/54* (2014.01)
*C09D 11/10* (2014.01)
(Continued)

(52) U.S. Cl.
CPC .......... *B41J 2/2107* (2013.01); *B41M 5/0017* (2013.01); *B41M 7/0036* (2013.01); *C09D 11/10* (2013.01); *C09D 11/322* (2013.01); *C09D 11/38* (2013.01); *C09D 11/40* (2013.01); *C09D 11/54* (2013.01)

(58) Field of Classification Search
CPC .............................. B41J 2/2107; C09D 11/54
See application file for complete search history.

(56) References Cited

U.S. PATENT DOCUMENTS

2007/0013759 A1* 1/2007 Kadomatsu ............ B41J 2/2114
                                                          347/102
2011/0211012 A1* 9/2011 Irita ....................... B41J 2/2114
                                                           347/20
(Continued)

FOREIGN PATENT DOCUMENTS

JP    2006-507159 A    3/2006
JP    2009-226851 A    10/2009
(Continued)

OTHER PUBLICATIONS

Extended European Search Report for EP Application No. 16157696.2, dated Jul. 26, 2016 (8 pages).

*Primary Examiner* — Alessandro Amari
*Assistant Examiner* — Roger W Pisha, II
(74) *Attorney, Agent, or Firm* — Harness, Dickey & Pierce, P.L.C.

(57) ABSTRACT

An ink jet recording method according to the invention includes attaching a reaction liquid including a reactant for aggregating or thickening a coloring ink component including a coloring material to a recording medium; attaching the coloring ink by an ink jet method to an area where the reaction liquid is attached, in a state where a residual rate of a volatile component of the reaction liquid attached on the recording medium is 25% by mass or more after attaching of the reaction liquid; and attaching a clear ink including a resin to the area where the coloring ink is attached.

20 Claims, 1 Drawing Sheet

(51) Int. Cl.
*C09D 11/322* (2014.01)
*C09D 11/38* (2014.01)
*C09D 11/40* (2014.01)

(56) References Cited

U.S. PATENT DOCUMENTS

2011/0303113 A1 12/2011 Sarkisian et al.
2012/0128949 A1 5/2012 Goto
2014/0292902 A1* 10/2014 Kagata ................ C09D 11/322
347/20

FOREIGN PATENT DOCUMENTS

JP      2013-071277 A   4/2013
WO   WO-2004-048114 A1   6/2004

* cited by examiner

INK JET RECORDING METHOD AND INK JET RECORDING APPARATUS

BACKGROUND

1. Technical Field

The present invention relates to an ink jet recording method and an ink jet recording apparatus.

2. Related Art

An ink jet recording method which causes a recording head of an ink jet recording apparatus to discharge minute ink droplets from nozzles to record an image on a recording medium is known in the related art. In recent years, the ink jet recording method has been used for recording an image not only on a recording medium having excellent ink absorbability (for example, plain paper, or the like), but also recording an image on a recording medium having less ink absorbability (low absorbability) (for example, an art paper, a coated paper, or the like), or a recording medium that hardly absorbs an ink (non-absorbability) (for example, plastic film, or the like). Also, the use of a water-based ink including water as a base has been reviewed as for an ink used for recording an image on the recording medium having low absorbability or non-absorbability, from a viewpoint of global environment and safety.

The water-based ink tends to be repelled on a recording medium having low absorbability or a recording medium having non-absorbability compared to a non-water-based ink including an organic solvent as a base. Accordingly, color unevenness of the recorded image is easily generated on the recording medium having low absorbability or non-absorbability. From this viewpoint, for example, it has been attempted to react a reaction liquid containing a multivalent metal salt with an aqueous (water-based) ink composition on the recording medium having low absorbability (JP-A-2009-226851, JP-A-2013-071277, and JP-A-2006-507159).

As described above, it is considered that inconvenience such as ink bleed of an image is suppressed, by bringing an ink into contact with a recording medium using a reaction liquid. However, JP-A-2009-226851, JP-A-2013-071277, and JP-A-2006-507159 disclose that the coated reaction liquid preferably has low water content (the amount of water after drying). In general, it is considered that when coating with the coloring ink is performed, after coating with the reaction liquid is performed and the reaction liquid is dried sufficiently, an image having excellent fixability is obtained, and the drying the reaction liquid has been attempted in the technologies disclosed in the above mentioned patent documents.

When the coloring ink is applied to the area where the reaction liquid is not dried, adhesion between the ink component and the recording medium may not be obtained sufficiently, and abrasion resistance (fixability) may not be sufficient. Specifically, when coating with the coloring ink is performed on the area where the reaction liquid is wet, the coloring ink is prematurely aggregated in an excessive manner, and the coloring ink may be fixed on the recording medium in a state of being in contacted with the recording medium insufficiently. Thus, there is a concern that adhesion of the coloring ink with the recording medium may be decreased, and fixability of a coating film may be decreased.

However, attaching the ink to the area before the reaction liquid is dried is more advantageous in that the ink component is more effectively aggregated and/or thickened, and the shape of the ink component becomes granular, and color developing properties improve. In the technologies of JP-A-2009-226851, JP-A-2013-071277, and JP-A-2006-507159, it is considered that securing of the fixability is the priority, and the color developing properties are not always sufficiently improved.

Furthermore, in order to dry the reaction liquid, when the configuration of heating the recording medium is provided, clogging of the recording head easily occurs, the time required for the drying becomes necessary, and miniaturization is difficult due to inclusion of a zone or drying unit for the drying in the apparatus, which is not preferable. Therefore, immediately recording an ink without providing the drying of the reaction liquid is advantageous, in order to increase the recording speed, make the apparatus compact without the drying zone, and reduce bad influence on the head due to the heating of a platen.

SUMMARY

An advantage of some aspects of the invention is to provide an ink jet recording method and an ink jet recording apparatus, which can stably record an image in which fixability is excellent, and printing unevenness is suppressed with respect to the recording medium.

The invention can be realized in the following aspects or application examples.

Application Example 1

According to an aspect of the invention, there is provided an ink jet recording method including: attaching a reaction liquid including a reactant for aggregating or thickening a coloring ink component including a coloring material to a recording medium; attaching the coloring ink by an ink jet method to an area where the reaction liquid is attached, in a state where a residual rate of a volatile component of the reaction liquid attached on the recording medium is 25% by mass or more; and attaching a clear ink including a resin to the area where the reaction liquid is attached, after the attaching of the coloring ink, or at the same time of the attaching of the coloring ink.

In this case, it is possible to stably record an image in which fixability is excellent, and printing unevenness is suppressed with respect to the recording medium. That is, it is possible to form an image in which fixability of an aggregate of the ink to the recording medium is excellent due to the resin of the clear ink.

Application Example 2

In the ink jet recording method according to Application Example 1, the recording medium may be a recording medium having low absorbability or a recording medium having non-absorbability.

In this case, when the coloring ink is attached, since the reaction liquid having a high residual rate of the volatile component easily remains on the surface of the recording medium, it is possible to form an image having more excellent color developing properties. That is, in this case, since the coloring ink is in contact with the reaction liquid including a large amount of the volatile components, the shape of aggregation of the coloring material becomes granular, which makes excellent color developing properties.

Application Example 3

In the ink jet recording method according to Application Example 1 or 2, the coloring ink may be a water-based coloring ink including a resin.

In this case, it is possible to further increase thickening properties of the coloring ink when the ink is attached to the recording medium, and to suppress bleed or effusion of an image.

Application Example 4

In the ink jet recording method according to Application Example 3, a resin included in the clear ink and a resin included in the coloring ink may be the same as each other.

In this case, it is possible to form an image having more excellent fixability.

Application Example 5

In the ink jet recording method according to any one of Application Examples 1 to 4, the surface temperature of the recording medium between the attaching of the reaction liquid and the attaching of the coloring ink may be 38° C. or lower, and the attaching of the coloring ink may be started within 30 seconds after the attaching of the reaction liquid to the recording medium is completed.

In this case, when the coloring ink is attached, since the reaction liquid having a high residual rate of the volatile component easily remains on the surface of the recording medium, it is possible to form an image having more excellent color developing properties.

Application Example 6

In the ink jet recording method according to any one of Application Examples 1 to 5, the attaching of the reaction liquid may include the attaching of the reaction liquid in which the attachment amount of the reactant included in the reaction liquid in the area where the reaction liquid is attached is 0.01 mg/inch$^2$ to 0.2 mg/inch$^2$.

Application Example 7

In the ink jet recording method according to any one of Application Examples 1 to 6, the attaching of the clear ink may include the attaching of the clear ink in which the attachment amount of the clear ink in the area where the clear ink is attached is 0.5 mg/inch$^2$ to 3 mg/inch$^2$.

Application Example 8

In the ink jet recording method according to any one of Application Examples 1 to 7, the content of the resin included in the clear ink may be 2% by mass to 20% by mass.

Application Example 9

According to another aspect of the invention, there is provided an ink set used for the ink jet recording method according to any one of Application Examples 1 to 8, the ink set including: a reaction liquid including a reactant for aggregating or thickening a coloring ink component having a coloring material; a coloring ink; and a clear ink including a resin.

In this case, it is possible to stably record an image in which fixability is excellent, and printing unevenness is suppressed with respect to the recording medium. That is, it is possible to form an image in which fixability of an aggregate of the ink to the recording medium is excellent due to the resin of the clear ink.

BRIEF DESCRIPTION OF THE DRAWING

The invention will be described with reference to the accompanying drawing, wherein like numbers reference like elements.

FIGURE is a diagram schematically illustrating one example of an ink jet recording apparatus used for the ink jet recording method according to the invention.

DESCRIPTION OF EXEMPLARY EMBODIMENTS

Figure 1:
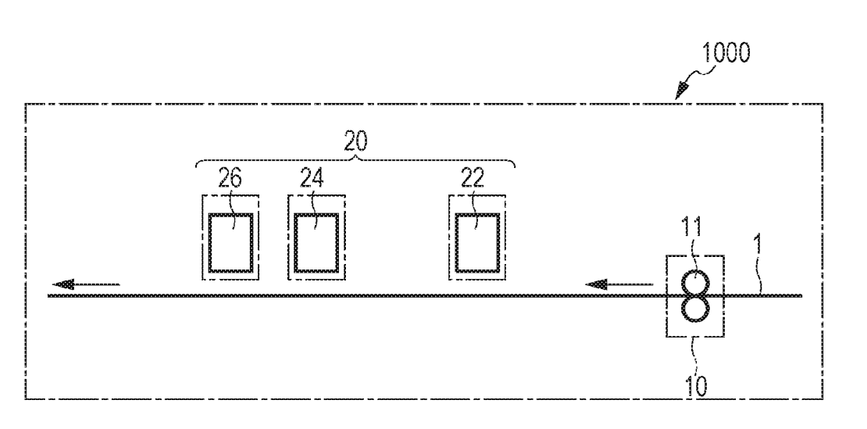

Hereinafter, several embodiments of the invention will be described. The embodiments described below are one example of the invention. The invention is not limited to the following embodiments and includes various embodiments implemented within the range not departing the gist of the invention. Also, the entirety of the configurations described below is not necessarily an essential configuration of the invention.

1. Ink Jet Recording Method

The ink jet recording method according to the embodiment includes a reaction liquid attachment step for attaching a reaction liquid including a reactant for aggregating or thickening a coloring ink component including a coloring material to a recording medium; a coloring ink attachment step for attaching the coloring ink by an ink jet method to the area where the reaction liquid is attached, in a state where a residual rate of a volatile component of the reaction liquid attached on the recording medium is 25% by mass or more, after the reaction liquid attachment step; and a clear ink attachment step for attaching a clear ink including a first resin (resin) to the area where the coloring ink is attached.

Hereinafter, the ink jet recording method according to the embodiment will be sequentially described.

1.1. Reaction Liquid Attachment Step

The reaction liquid attachment step is a step of attaching the reaction liquid including the reactant to the recording medium. The reaction liquid is at least attached to the area where the coloring ink is attached. The reaction liquid may be attached to a part of the recording medium, or may be attached to the entirety of the parts thereof. The reaction liquid may be preferably attached only to the area where the coloring ink is attached, from a viewpoint of reducing the use amount of the reaction liquid. Also, the area where only the reaction liquid is attached may remain on the recording medium.

The reactant is reacted (interacted) with a coloring material included in a coloring ink (described below) or a resin dispersant (a second resin (resin)) which may include in the coloring ink to have a function of aggregating the coloring material or an action of thickening the coloring ink component. Specifically, the reactant aggregates or thickens the coloring ink component, the aggregation of the coloring material increases the color developing properties, printing unevenness is reduced, and bleed or effusion in the image can be suppressed by thickening. According to the above, it is possible to suppress the printing unevenness of the image to be recorded.

As the method for attaching the reaction liquid, any methods of spin coating, spray coating, gravure roll coating, reverse roll coating, bar coating, and an ink jet method can be used.

The reaction liquid attachment step preferably includes the reaction liquid attachment step in which the attachment amount of the reactant included in the reaction liquid to the recording medium is 0.01 mg/inch$^2$ to 5 mg/inch$^2$, and more preferably includes the reaction liquid attachment step in which attachment amount of the reactant included in the reaction liquid to the recording medium is more preferably 0.05 mg/inch$^2$ to 5 mg/inch$^2$, more preferably 0.08 mg/inch$^2$ to 3 mg/inch$^2$, and still more preferably 0.1 mg/inch$^2$ to 2 mg/inch$^2$. When the method includes the reaction liquid attachment step in which the attachment amount is 0.01 mg/inch$^2$ or more, the coloring material can be easily aggregated, and in some cases, the coloring ink can be easily thickened due to the second resin. In addition, when the method includes the reaction liquid attachment step in which the attachment amount is 5 mg/inch$^2$ or less, fixability becomes more excellent, which is preferable. In particular, from a viewpoint of achievement of still more excellent fixability, the attachment amount of the reactant included in the reaction liquid to the recording medium is preferably 0.2 mg/inch$^2$ or less, and more preferably 0.1 mg/inch$^2$ or less.

The ink jet recording method according to the embodiment includes such a reaction liquid attachment step. In the same manner, the expression that the respective attachment steps include the attachment step having a predetermined attachment amount means that the steps include the attachment step having at least the attachment amount. In addition, the attachment amount corresponds to this attachment step, and all of the attached substances do not always remain in the finally obtained recorded matter.

In the ink jet recording method according to the embodiment, it is not necessary to dry the reaction liquid by heating, a step of drying the reaction liquid may be included after the reaction liquid attachment step and before the coloring ink attachment step. In this case, the drying may be performed in a state where the residual rate of the volatile component of the reaction liquid attached to the recording medium is 25% by mass or more. The reaction liquid drying step may be performed by natural drying, but may be performed by heating drying. The method for heating the reaction liquid is not particularly limited, but the methods described below can be used. However, the size of the apparatus to be used becomes large or the energy to be used becomes large in the heating and drying step.

Here, the residual rate of the volatile component of the reaction liquid herein indicates a residual rate (drying rate) of the volatile component of the reaction liquid on the recording medium immediately before starting the attaching of the coloring ink, and can be calculated by the following equation.

Volatile component residual rate [%]=100−(($Af$−$A$)/($Af$−$Ae$))×100

In the equation, Af represents a total impartment amount (discharge amount [mg]) of the reaction liquid attached to the recording medium. Also, Ae represents a residual substance amount [mg] of the reaction liquid on the recording medium, in a state where the reaction liquid is dried (volatilized) to the extent that the recorded matter is sufficiently dried to be used. Furthermore, A represents a total mass [mg] of the reaction liquid on the recording medium immediately before the attaching of the coloring ink.

In the equation, Af, as an impartment amount of a reaction liquid, can be obtained from, for example, discharge data of the ink jet recording apparatus and mass per dot. A can be obtained by measuring the mass of the recording medium at the time of starting the attaching of the coloring ink and the mass of the recording medium before the reaction liquid attachment step, and taking the difference between them.

When measuring the residual rate of the volatile component, it is convenient to use a recording medium prepared for the measurement. For example, the measurement can be performed by an electronic balance. Also, when performing the measurement, a relationship between the residual amount and drying time from when the reaction liquid is imparted to when the predetermined heating drying is performed in the platen. Also, when recording is performed by an ink jet recording apparatus, the time from when the reaction liquid is imparted to when the coloring ink is imparted may be set to the time obtained from the relationship between the drying time obtained in the above and the residual amount, thereby obtaining a desired residual amount.

When the reaction liquid drying step is performed by heating, the heating method is not particularly limited, and the examples thereof include a heat press method, a normal pressure steam method, a high pressure steam method, and a thermal fixing method. In addition, as a source of heating, an infrared ray (lamp) can be exemplified. In addition, when the reaction liquid drying step is included, handling of the recording when moving the recording medium can be easy.

However, as described above, it is preferable not to include the heating step for heating and drying the reaction liquid after the reaction liquid attachment step. In addition, the surface temperature of the recording medium from the reaction liquid attachment step to the coloring ink attachment step is preferably 40° C. or lower, more preferably 38° C. or lower, still more preferably 35° C. or less, particularly preferably 30° C. or lower, and more particularly preferably 25° C. or lower. In addition, the time taken from the completion of the attachment of the reaction liquid to the start of the attachment of the coloring ink is preferably within 30 seconds, more preferably within 20 seconds, still more preferably within 10 seconds, and particularly preferably within 5 seconds. In this case, it is preferable since it is easy to set the residual rate of the volatile component of the reaction liquid within the above range.

In addition, the ink jet recording method according to the embodiment may include, in addition to the reaction liquid attachment step, for example, corona treatment, atmospheric pressure plasma treatment, frame treatment, ultraviolet ray irradiation treatment, and solvent treatment. These treatments can be executed by using known apparatuses. When these treatments are conducted, it is preferable to conduct the treatment before the reaction liquid attachment step. By conducting, for example, the corona treatment before the reaction liquid attachment step, it is possible to further increase adhesion or wettability of the reaction liquid with respect to the surface of the recording medium, and further improve adhesion or abrasion resistance of the image to be recorded.

A composition of the reaction liquid and a reactant included in the reaction liquid will be described below.

1.2. Recording Medium

A recording medium having non-absorbability or low absorbability in the specification indicates a recording medium having properties of not absorbing an ink at all or hardly absorbing an ink. Quantitatively, the recording medium having non-absorbability or low absorbability indicates a "recording medium of which the water absorption amount is 10 mL/m$^2$ or less within a half of 30 msec from the start of contacting a liquid according to Bristow method". The Bristow method is widely used as a method for measuring the liquid absorption amount in a short period of time, and has been adopted by Japan Technical Association of the Pulp and Paper Industry (Japan TAPPI). The details of the testing method is described in the standard No. 51 "Paper and Paperboard-liquid absorbability testing method-Bristow method" of the "JAPAN TAPPI paper and pulp testing method 2000 version".

Examples of the recording medium having non-absorbability include a medium in which a base material having no ink receiving layer such as a plastic film, a plastic sheet, a plastic plate, and a paper is coated with a plastic, and a medium on which a plastic film is attached. Examples of the plastic herein include polyvinyl chloride, polyethylene terephthalate, polycarbonate, polystyrene, polyurethane, polyethylene, polypropylene, poly(meth)acrylate, and modified products, copolymers, and blended products thereof.

In addition, examples of the recording medium having low absorbability include a recording medium provided with a coating layer for receiving an ink on the surface thereof. As the paper base material, for example, actual printing papers such as an art paper, coated paper, and a matte paper can be exemplified. When the base material is a plastic film, the examples thereof include a film of which the surface such as polyvinyl chloride, polyethylene terephthalate, polycarbonate, polystyrene, polyurethane, polyethylene, and polypropylene is coated with a hydrophilic polymer, and a film coated with particles such as silica and titanium, and a binder.

1.3. Coloring Ink Attachment Step

The coloring ink attachment step is a step of recording an image on the area where the reaction liquid is attached, using the coloring ink for ink jet recording including the coloring material after the aforementioned reaction liquid attachment step. The coloring ink does not need to be attached on the entire area where the reaction liquid is attached, and the area where the resin liquid and the reaction liquid are attached may remain in the recording medium. According to this, since the coloring material included in the coloring ink is reacted with the reactant to aggregate the coloring material on the surface of the recording medium, the color developing properties of the recorded image can be improved. Furthermore, since the coloring ink is attached on the surface of the recording medium having the reaction liquid uniformly coated (attached) thereon, the reaction (interaction) of the coloring ink and the reactant can be performed. According to this, generation of printing unevenness of the image to be recorded can be suppressed. Furthermore, when the second resin is included in the coloring ink, due to the contact of the third resin with the reactant, the coloring ink can be thickened, diffusion of the components between ink droplets on the recording medium can be suppressed, and bleed or effusion can be reduced.

The "printing unevenness" described in the specification means a phenomenon in which color unevenness is observed on the recorded image, because a color difference is generated between droplets when the droplets of the same coloring ink are attached on the recording medium, or filling of the image fails due to the droplets repelled by the recording medium.

In the coloring ink attachment step, an ink jet recording head is caused to discharge the coloring ink from nozzles, and attach the ink on the surface of the recording medium (the area where reaction liquid is attached), to record an image on the recording medium. The number of colors in the coloring ink attached in this step is not limited, and may be a single color (single color printing), or multiple colors (color printing). Even when the coloring ink having multiple colors is used, each of the coloring inks are operated as described in the aspect.

The coloring ink attachment step preferably includes the coloring ink attachment step in which the attachment amount of the coloring ink is 0.01 mg/inch$^2$ to 25 mg/inch$^2$, more preferably 0.1 mg/inch$^2$ to 20 mg/inch$^2$, and still more preferably 1 mg/inch$^2$ to 10 mg/inch$^2$, from a viewpoint of a desired color can be imparted to the recorded matter while maintaining the quality of the recorded matter excellent, or the use amount of the coloring ink can be reduced. In the coloring ink attachment step, the upper limit is more preferably 20 mg/inch$^2$ or less, even more preferably 15 mg/inch$^2$ or less, and still more preferably 10 mg/inch$^2$ or less. The attachment amount corresponds to the area of the recording medium where the reaction liquid attachment step is performed.

After the coloring ink attachment step, a step of drying the image recorded on the recording medium may be included. In this case, the ink may be dried to the extent that stickiness cannot be felt when contact is made with the resin liquid attached on the recording medium. The image drying step may be performed by natural drying, but may be performed by heating drying. The image heating method is not particularly limited, and the same methods exemplified in the description of heating method of the reaction liquid can be used.

The coloring ink attachment step is performed in a state where the residual rate of the volatile component of the reaction liquid is 25% by mass or more. In addition, the coloring ink attachment step is performed in a state where the residual rate of the volatile component of the reaction liquid preferably 30% by mass or more, more preferably 40% by mass or more, even more preferably 50% by mass or more, still more preferably 60% by mass or more, and particularly preferably 70% by mass or more. That is, when the residual rate of the volatile component of the reaction liquid is 25% by mass or more, droplets of the coloring ink are easily in contact with the reaction liquid in every direction, and the coloring material of the coloring ink is more effectively aggregated or thickened. In addition, the upper limit of the residual rate of the volatile component of the reaction liquid at the time of performing the coloring ink attachment step is not particularly limited, and for example, the upper limit is 100% by mass or less or 95% by mass or less.

In the ink jet recording method according to the embodiment, when the recording medium having non-absorbability and the recording medium having low absorbability are used, the reaction liquid is easily fixed on the surface of the recording medium. In addition, if the drying is not performed after the reaction liquid attachment step, it is easy to set the residual rate of the volatile component of the reaction liquid to 25% by mass or more. In addition, and even if natural drying or the above mentioned drying by heating is performed after the reaction liquid is attached, depending on the drying rate, it is possible to set the residual rate of the volatile component of the reaction liquid to 25% by mass or more.

The coloring ink attachment step is performed by the ink jet method. The ink jet recording apparatus used in this step is not particularly limited, and for example, any apparatuses are preferable if the apparatus can control discharge timing of the coloring ink from nozzles and a relative position of the nozzles and a medium corresponding to a predetermined image so as to attach an ink on a predetermined position of the medium. A discharge method of the ink from the nozzles is not limited, and for example, electrostatic suction method, piezoelectric method, and thermal jet method are preferable. Also, as a method for changing the relative position of the nozzles and medium, the method may be so-called a serial type or a line type. Also, as a typical ink jet recording apparatus, the apparatus that includes an ink jet recording head, a main body, a tray, a head driving mechanism, and a carriage can be exemplified. The ink jet recording head has a plurality of nozzles, and the nozzles are communicated with an ink cartridge (an ink container) having the nozzles attached thereto or separated therefrom and discharge an ink of the cartridge. Then, for example, at least one ink cartridge may be used with the coloring inks each having different colors filled therein. Also, the ink jet recording apparatus may be configured to discharge various inks (for example, in a case where the resin liquid, reaction liquid, and clear ink are attached by the ink jet method, each of them are introduced to the recording apparatus as an ink), in addition to the coloring ink. If this ink jet recording apparatus is used, it is possible to easily discharge the coloring ink and attach (impart) to the recording medium, and form a predetermined image or a pattern on the recording medium.

A composition of the coloring ink and the second resin (resin) which may be included in the coloring ink will be described below.

1.4. Clear Ink Attachment Step

The clear ink attachment step is a step of attaching a clear ink including a first resin (resin) to the area where the reaction liquid is attached, after the aforementioned coloring ink attachment step, or at the same time of the coloring ink attachment step. The clear ink does not need to be attached only on the area where the coloring ink is attached, and may be attached on the entire surface of the recording medium or the area where the coloring ink is not attached. When the clear ink attachment step is performed at the same time of the coloring ink attachment step, for example, in a case where recording is performed on the recording area facing the head by discharging the ink from the nozzles while changing a relative position of the head having the nozzles and the recording medium, and scanning (passing) for attaching the discharged ink on the recording medium for a plurality of times, scanning for attaching the clear ink to the recording area by discharging the clear ink is performed, during the same scanning that is carried out for attaching the coloring ink to the recording medium by discharging the coloring ink. When the clear ink attachment step is performed after the coloring ink attachment step, for example, there are two cases: in a case where recording is performed on the recording area by a plurality of times of scanning, after the coloring ink is discharged and attached to the recording area, the clear ink is discharged and attached on the recording area; or in a case where recording is performed on the recording area by one scanning, the nozzle discharging the clear ink is disposed on the downstream side in the scanning direction than the nozzle discharging the coloring ink. Among the above, it is preferable to perform the clear ink attachment step after the coloring ink attachment step, from a viewpoint of further exhibiting the effect of the embodiment.

According to this step, at least the first resin (resin) is imparted to the area where the coloring ink is attached. According to the above, the coloring ink is coated with the clear ink, the coloring ink hardly falls off from the recording medium, and fixability (abrasion resistance) of the image can be increased. Also, since the coloring ink is hardly in contact with moisture from outside due to the presence of the first resin (resin), wet abrasion resistance can be imparted.

As described above, in the ink jet recording method according to the embodiment, when the coloring ink is attached, the coloring ink component is aggregated. The aggregation improves the color developing properties of the image; however, the aggregate tends to be granular, and the contact area with the recording medium may be small. In the ink jet recording method according to the embodiment, the aggregate is made to be in contact with the recording medium by coating the aggregate with the clear ink so as to impart excellent abrasion resistance.

The attachment amount of the clear ink in this attachment step is not particularly limited, and for example, the attachment step may include the clear ink attachment step in which the attachment amount of the clear ink is 0.05 mg/inch$^2$ or more, preferably 0.1 mg/inch$^2$ to 5.0 mg/inch$^2$, and more preferably 0.5 mg/inch$^2$ to 3 mg/inch$^2$. In addition, the aforementioned attachment amount corresponds to the area where the reaction liquid attachment step and coloring ink attachment step are performed.

As the means of performing the clear ink attachment step, for example, various methods such as spin coating, dip coating, spray coating, gravure roll coating, reverse roll coating, bar coating, and an ink jet method can be used, and the method can be appropriately used in consideration of the attachment amount of the clear ink, the size of the recording medium, and the apparatus configuration.

After the clear ink attachment step is performed, a step of drying the clear ink or entire liquids attached on the recording medium may be included. In this case, for example, the drying may be performed to the extent that stickiness cannot be felt on the recording medium.

The drying may be performed by natural drying, but may be performed by heating drying, from a viewpoint of improving drying speed, promoting fusion of the first resin (resin) to the recording medium, or promoting formation of a film. The heating method is not particularly limited, and for example, a heat press method, a normal pressure steam method, a high pressure steam method, and a thermal fixing method can be exemplified.

A composition of the clear ink and the first resin (resin) included in the clear ink will be described below.

1.5. Operational Effect

According to the ink jet recording method according to the embodiment, it is possible to stably record an image on the recording medium, in which color developing properties and fixability are excellent, and printing unevenness is suppressed. That is, according to the ink jet recording method according to the embodiment, since the coloring ink is in contact with the reaction liquid in a state where the residual rate of the volatile component is 25% by mass or more, it is possible to simplify the reaction liquid drying step, and form an image in which fixability of the aggregate of the ink to the recording medium is excellent, due to the resin (first resin) of the clear ink.

2. Reaction Liquid, Clear Ink and Coloring Ink

Hereinafter, the reaction liquid, coloring ink, and clear ink used for the ink jet recording method according to the embodiment will be described in an order of the reaction liquid, clear ink, and coloring ink.

2.1. Reaction Liquid

In the ink jet recording method according to the embodiment, the reaction liquid is used in the reaction liquid attachment step. Hereinafter, components included in the reaction liquid and components which may be included will be described.

2.1.1. Reactant

The reaction liquid according to the embodiment contains a reactant. The reactant has a function of aggregating a coloring material by reacting the coloring material included in the coloring ink with a pigment dispersing element and/or a resin which may be included in the coloring ink. By doing this, color developing properties of the image to be recorded by the coloring ink can be improved. Also, the reactant can increase viscosity (thicken) of the coloring ink by reacting a pigment dispersing element and/or a resin which may be included in the coloring ink. By doing this, effusion or bleed of the coloring ink can be reduced.

The reactant is not particularly limited, and the examples thereof include a metal salt, an organic acid, and other cationic compounds. As the other cationic compounds, a cationic resin and a cationic surfactant can be used. A multivalent metal salt is preferable as the metal salt, and other metal salts can be used other than the multivalent metal salt. Among these reactants, at least one selected from the metal salt and the organic acid is preferably used, from a viewpoint of having excellent reactivity with the components included in the coloring ink.

By neutralizing a surface charge of the components included in the coloring ink or changing pH of the coloring ink using the reactant, these components are aggregated or precipitated, and the coloring ink is aggregated or precipitated. Examples of the components which are reacted with the reactant included in the coloring ink include a coloring material and a resin described below.

Among the metal salt, the multivalent metal compound is not limited to the following, and the examples thereof include a titanium compound, a chromium compound, a copper compound, a cobalt compound, a strontium compound, a barium compound, an iron compound, an aluminium compound, a calcium compound, a magnesium compound, and salts thereof (multivalent metal salt). Among these multivalent metal compounds, in order to effectively aggregate a pigment, at least one selected from the group consisting of an aluminium compound, a calcium compound, a magnesium compound, and salts thereof is preferable, dissociable salts of alkali earth metals such as calcium and magnesium are more preferable, and at least any one of a calcium salt and a magnesium salt is still more preferable.

In addition, as the multivalent metal compounds, ionic multivalent metal salt is preferable, in particular, when the aforementioned multivalent metal salt is a magnesium salt or a calcium salt, stability of the reaction liquid becomes more excellent. In addition, the counter ion of the multivalent metal may be any of an inorganic acid ion and an organic acid ion.

The specific examples of the aforementioned multivalent metal salt include calcium carbonate such as heavy calcium carbonate and light calcium carbonate, calcium nitrate, calcium chloride, calcium sulfate, magnesium sulfate, barium sulfate, zinc carbonate, aluminium silicate, calcium silicate, and magnesium silicate. Among the above, in order to secure sufficient solubility in water, and reduce a trace due to the reaction liquid (so as to make the trace inconspicuous), at least any one of magnesium sulfate, calcium nitrate, and calcium chloride is preferable, and calcium nitrate is more preferable.

Examples of the metal salt other than the multivalent metal salt include a monovalent metal salt such as a sodium salt and a potassium salt. Examples of the metal salt include sodium sulfate and potassium sulfate.

In addition, examples of the multivalent metal compounds include, in addition to the above, an inorganic pigment such as a chalk, kaolin, calcined clay, talc, titanium oxide, zinc oxide, zinc sulfide, synthesized silica, aluminium hydroxide, alumina, sericite, white carbon, saponite, calcium montmorillonite, sodium montmorillonite, and bentonite, and an organic pigment such as acrylic plastic pigment and an urea polymer substance.

The preferable examples of the organic acid include polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, and derivatives of these compounds, or salts thereof. The organic acid may be used alone, or two or more thereof may be used in combination.

Examples of the inorganic acid include sulfuric acid, hydrochloric acid, nitric acid, phosphoric acid, and salts thereof. The inorganic acid may be used alone, or two or more thereof used in combination.

Examples of the cationic resin include a cationic urethane-based resin, a cationic olefin-based resin, and a cationic allylamine-based resin.

As the cationic urethane-based resin, the well-known resins can be appropriately selected to be used. As the cationic urethane-based resin, commercially available products can be used, and for example, HYDRAN CP-7010, CP-7020, CP-7030, CP-7040, CP-7050, CP-7060, CP-7610 (trade name, manufactured by DIC Corporation), SUPER FLEX 600, 610, 620, 630, 640, 650 (trade name, manufactured by DKS Co., Ltd.), urethane emulsion WBR-2120C, and WBR-2122C (trade name, manufactured by TAISEI FINE CHEMICAL CO., LTD.) can be used.

The cationic olefin resin has olefin such as ethylene and propylene as a structural skeleton, and the well-known resins can be appropriately selected to be used. Also, the cationic olefin resin may be an emulsion which is dispersed in a solvent including water or an organic solvent. As the cationic olefin resin, commercially available products can be used, and the examples thereof include Arrowbase CB-1200 and CD-1200 (trade name, manufactured by UNITIKA LTD.).

As the cationic allylamine-based resin, the well-known resins can be appropriately selected to be used, and the examples thereof include poly allylamine hydrochloride, poly allylamine amide sulfate, an allylamine hydrochloride.diallylamine hydrochloride copolymer, an allylamine acetate.diallylamine acetate copolymer, an allylamine acetate.diallylamine acetate copolymer, an allylamine hydrochloride.dimethyl allylamine hydrochloride copolymer, an allylamine.dimethyl allylamine copolymer, poly diallylamine hydrochloride, poly methyl diallylamine hydrochloride, poly methyl diallylamine amide sulfate, poly methyl diallylamine acetate, poly diallyl dimethyl ammonium chloride, a diallylamine acetate.sulfur dioxide copolymer, a diallyl methylethyl ammonium ethyl sulfate.sulfur dioxide copolymer, a methyldiallylamine hydrochloride.sulfur dioxide copolymer, a diallyldimethyl ammonium chloride.sulfur dioxide copolymer, and a diallyldimethyl ammonium chloride.acrylamide copolymer. As the cationic allylamine-based resin, commercially available products can be used, and the examples thereof include PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, PAS-J-81 (trade name, manufactured by NITTOBO MEDICAL CO., LTD.), HYMO Neo-600, HYMOLOC Q-101, Q-311, Q-501, HIMAX SC-505, and SC-505 (trade name, manufactured by HYMO Co., Ltd.).

Examples of the cationic surfactant include primary, secondary, and tertiary amine salt-type compounds, an alkylamine salt, a dialkylamine salt, an aliphatic amine salt, a benzalkonium salt, a quaternary ammonium salt, a quaternary alkylammonium salt, an alkyl pyridinium salt, a sulfonium salt, a phosphonium salt, an onium salt, and an imidazolinium salt. The specific examples thereof include hydrochlorides or acetates of laurylamine, coconut-type amine, rosin amine, lauryl trimethyl ammonium chloride, cetyl trimethyl ammonium chloride, benzyl tributyl ammonium chloride, benzalkonium chloride, dimethyl ethyl lauryl ammonium ethyl sulfate, dimethyl ethyl octyl ammonium ethyl sulfate, trimethyl lauryl ammonium hydrochloride, cetyl pyridinium chloride, cetyl pyridiniumbromide, dihydroxyethyl lauryl amine, decyl dimethyl benzyl ammonium chloride, dodecyl dimethyl benzyl ammonium chloride, tetradecyl dimethyl ammonium chloride, hexadecyl dimethyl ammonium chloride, and octadecyl dimethyl ammonium chloride.

The content of the reactant can be appropriately determined so as to exhibit the aforementioned effect, and for example, 0.1% by mass to 40% by mass is preferable, and 2% by mass to 25% by mass is more preferable with respect to the total mass of the reaction liquid.

2.1.2. Water

The reaction liquid according to the embodiment may contain water. The water functions as a main medium of the reaction liquid, and is evaporated and dispersed by drying. As the water, pure water such as ion exchanged water, ultrafiltrated water, reverse osmotic water, and distilled water, or water from which ionic impurities are completely removed such as ultrapure water is preferable. Also, when water sterilized by irradiation with ultraviolet rays or addition of hydrogen peroxide is used, it is possible to prevent generation of fungi or bacteria when the reaction liquid is stored for a long period of time, which is preferable.

The content of water included in the reaction liquid may be, for example, 50% by mass or more or 60% by mass or more with respect to the total mass of the reaction liquid.

2.1.3. Organic Solvent

The reaction liquid according to the embodiment may contain an organic solvent. The organic solvent has a function of increasing adhesion of the reaction liquid with respect to the aforementioned recording medium having low absorbability or having non-absorbability, or acting as a moisturizing agent.

The organic solvent is not particularly limited, and the examples thereof include 1,2-alkanediols, polyalcohols, pyrrolidone derivatives, and glycol ethers.

Examples of the 1,2-alkanediols include 1,2-propanediol 1,2-butanediol, 1,2-pentanediol, 1,2-hexanediol, and 1,2-octanediol. The 1,2-alkanediols has an excellent effect of causing the recording medium to wet uniformly by increasing wettability of the reaction liquid with respect to the recording medium. When the 1,2-alkanediols are contained, the content thereof may be 1% by mass to 20% by mass with respect to the total mass of the reaction liquid.

Examples of the polyalcohols include ethylene glycol, diethylene glycol, propylene glycol, dipropylene glycol, 1,3-propanediol, 1,4-butanediol, 1,6-hexanediol, trimethylolpropane, and glycerin. When the polyalcohols are contained, the content thereof may be 2% by mass to 30% by mass with respect to the total mass of the reaction liquid.

Examples of the pyrrolidone derivatives include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone.

Examples of the glycol ethers include ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-ethylhexyl ether, diethylene glycol mono-2-ethylhexyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, and tripropylene glycol monomethyl ether. These may be used alone, or two or more thereof may be used in combination. The glycol ethers can control wettability of the reaction liquid with respect to the recording medium.

2.1.4. Surfactant

The reaction liquid according to the embodiment may contain a surfactant. The surfactant has a function of increasing wettability with respect to the recording medium by decreasing the surface tension. Among the surfactant, for example, an acetylene glycol-based surfactant, a silicone-based surfactant, and a fluorine-based surfactant may be preferably used.

The acetylene glycol-based surfactant is not particularly limited, and the examples thereof include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF110D (trade name, all of the above are manufactured by Air Products and Chemicals. Inc.), Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, AE-3 (trade name, all of the above are manufactured by Nissin Chemical Co., Ltd.), ACETYLENOL E00, E00P, E40, and E100 (trade name, all of the above are manufactured by Kawaken Fine Chemicals Co., Ltd.).

The silicone-based surfactant is not particularly limited, and a polysiloxane-based compound is preferable. The polysiloxane-based compound is not particularly limited and the examples thereof include polyether modified organosiloxanes. Examples of the commercially available products polyether modified organosiloxanes include BYK-306, BYK-307, BYK-333, BYK-341, BYK-345, BYK-346, BYK-348 (trade name, all of the above are manufactured by BYK JAPAN K.K.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade name, manufactured by Shin-Etsu Chemical Co., Ltd.).

As the fluorine-based surfactant, a fluorine modified polymer is preferably used, and the specific example thereof is BYK-340 (manufactured by BYK Japan K.K.).

When the surfactant is contained, the content thereof may be 0.1% by mass to 1.5% by mass with respect to the total mass of the reaction liquid.

2.1.5 Other Components

The reaction liquid according to the embodiment, if necessary, may contain a pH adjuster, a preservative, a fungicide, an antirust agent, a chelating agent, and a resin.

2.1.6. Properties of Reaction Liquid

When the reaction liquid according to the embodiment is attached to the recording medium by the ink jet method, the surface tension at a temperature of 20° C. is preferably 20 mN/m to 40 mN/m, and more preferably 25 mN/m to 35 mN/m, from a viewpoint of taking a balance between an image quality and reliability of the ink for ink jet recording. Also, when the reaction liquid according to the embodiment is attached to the recording medium by the ink jet method, from the same viewpoint, the viscosity of the reaction liquid at a temperature of 20° C. is preferably 3 mPa·s to 10 mPa·s, and more preferably 3 mPa·s to 8 mPa·s.

2.2. Clear Ink

In the ink jet recording method according to the embodiment, the clear ink is used in the clear ink attachment step.

The clear ink used in the clear ink attachment step contains a first resin (resin). The coloring ink component attached to the recording medium is coated with the first resin and the coloring ink hardly falls off from the recording medium. According to this, the first resin has a function of increasing fixability (abrasion resistance) of the image. Also, due to the presence of the first resin, since the coloring ink is hardly in contact with moisture from outside, wet abrasion resistance can be imparted. Furthermore, when a step of fusing the first resin is included after the clear ink attachment step, a film of the first resin can be formed on the surface of the recording medium, thereby obtaining a recorded matter having a further higher quality. The clear ink is not a coloring ink used for coloring, and the content of the coloring material with respect to the ink is 0.5% by mass or less, preferably 0.1% by mass or less, and more preferably 0.05% by mass or less. The coloring ink may not contain the coloring material.

Hereinafter, components included in the clear ink and components which may be included in the clear ink will be described.

2.2.1. First Resin

The clear ink contains a resin. In the embodiment, the resin contained in the clear ink is referred to as a first resin. The first resin can improve physical properties of the image to be recorded such as adhesion, abrasion resistance and (fixability).

Examples of the first resin included in the clear ink include well-known resins such as a urethane-based resin, an acrylic resin, a fluorene-based resin, a polyolefin-based resin, a rosin modified resin, a terpene-based resin, a polyester-based resin, a polyamide-based resin, an epoxy-based resin, and a vinyl chloride-based resin. The vinyl chloride-based resin includes a vinyl chloride copolymer such as a vinyl chloride-vinyl acetate copolymer. These resins may be used alone, or two or more thereof may be used in combination.

Among the aforementioned resins, the first resin included in the clear ink according to the embodiment preferably includes a urethane-based resin, an acrylic resin, and a polyolefin-based resin. When these resins are used, the effect of improving adhesion of the image to the recording medium becomes more excellent.

The urethane-based resin is a general name of the resin having urethane bond. As the urethane-based resin, in addition to the urethane bond, a polyether-based urethane resin including ether bond on a main chain, a polyester-based urethane resin including ester bond on a main chain, and a polycarbonate-based urethane resin including carbonate bond on a main chain may be used. As the urethane-based resin, commercially available products may be used, for example, commercially available products such as SUPER FLEX 460, 460s, 840, E-4000 (trade name, manufactured by DKS Co., Ltd.), RESAMINE D-1060, D-2020, D-4080, D-4200, D-6300, D-6455 (trade name, manufactured by Dainichiseika Color&Chemicals Mfg. Co., Ltd.), TAKELAC WS-6021, W-512-A-6 (trade name, manufactured by Mitsui Chemicals Polyurethanes INC.,), SUNCURE 2710 (trade name, manufactured by LUBRIZOL Corporation), and Permalin UA-150 (trade name, manufactured by Sanyo Chemical Industries, Ltd.) may be used.

The acrylic resin is a general name of a polymer obtained by polymerizing at least an acrylic monomer such as (meth) acrylic acid and (meth)acrylate, and the examples thereof include a (meth)acryl resin obtained from the acrylic monomer, and a copolymer of the acrylic monomer and monomers other than the acrylic monomer (for example, a vinyl-based monomer such as sytrene). Acrylamide and acrylonitrile can be also used as the acrylic monomer. As a resin emulsion using the acrylic resin as a raw material, commercially available products may be used, and the examples thereof include FK-854 (trade name, manufactured by CHIRIKA. Co., ltd.), Mowinyl 952B, 718A (trade name, manufactured by The Nippon Synthetic Chemical Industry Co., Ltd.), Nipol LX852, and LX874 (trade name, manufactured by ZEON Corporation).

In addition, in the specification, a styrene acrylic resin described below may be contained in the acrylic resin. Also, in the specification, the description of (meth)acryl means at least one of acryl and methacryl.

The styrene acrylic resin is a copolymer obtained from a styrene monomer and acrylic monomer, and the examples thereof include a styrene-acrylic acid copolymer, a styrene-methacrylic acid copolymer, a styrene-methacrylic acid-acrylate copolymer, a styrene-α-methylstyrene-acrylic acid copolymer, and a styrene-α-methylstyrene-acrylic acid-acrylate copolymer. As the styrene acrylic resin, commercially available products may be used, and the examples thereof include JONCRYL 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, 7610 (trade name, MANUFACTURED BY BASF JAPAN LTD.), Mowinyl 966A, 975N (trade name, manufactured by The Nippon Synthetic Chemical Industry Co., Ltd.), and VINYBLAN 2586 (trade name, manufactured by Nissin Chemical Co., Ltd.).

The polyolefin-based resin has olefin such as ethylene, propylene, and butyrene as a structural skeleton, and the well-known resins may be appropriately selected to be used. As the olefin resin, commercially available products may be used, and the examples thereof include Arrowbase CB-1200 and CD-1200 (trade name, manufactured by UNITIKA LTD.).

The first resin included in the clear ink preferably includes a resin having a glass transition temperature (Tg) of 50° C. or lower, more preferably includes a resin having Tg of −80° C. to 50° C., and still more preferably includes a resin having Tg of −80° C. to 40° C. When the first resin includes a resin having Tg of 50° C. or lower, adhesion of the clear ink to the recording medium may become excellent, and when the first resin includes a resin having Tg of −80° C. or higher, it possible to suppress that the tackiness of the clear ink attached on the recording medium is excessively increased. In addition, when the Tg is equal to or lower than room temperature (25° C.), film forming properties (film forming) of the resin may become excellent. The glass transition temperature of the first resin included in the clear ink can be changed by changing at least one of resin modification, a polymerization condition, and a type or a configuration ratio of the substances which constitute a resin used when performing polymerization to obtain the first resin, such as a monomer, a compound having two or more isocyanate groups, and a compound having two or more active hydrogen groups. Examples of the polymerization condition include a temperature of the polymerization, a type of the medium to contain a monomer, a monomer concentration in the medium, and a polymerization initiator, or a type or a use amount of a catalyst used for the polymerization. The glass transition temperature can be measured by a differential scanning calorimetry (DSC method) based on JIS K7121.

The content of the first resin (in terms of solid content) in the clear ink is 1% by mass to 30% by mass, preferably 1.5% by mass to 25% by mass and more preferably 2% by mass to 20% by mass with respect to the total mass of the clear ink. When the content of the first resin included in the clear ink is within the aforementioned range, the effect of improving fixability (abrasion resistance) of the image tends to become more excellent.

The first resin may be included in the clear ink as a dispersing element such as an emulsion, or may be included in the clear ink in a state of being dissolved. When the first resin is included as the dispersing element, it is more preferable from a viewpoint of water resistance or abrasion resistance of the recorded matter.

2.2.2. Water

The clear ink according to the embodiment contains water. Since the preferable water to be used is same as those exemplified in the description of the reaction liquid, the description thereof is omitted. The content of the water may be, for example, 50% by mass or more with respect to the total mass of the clear ink.

2.2.3. Organic Solvent

The clear ink according to the embodiment may contain an organic solvent. The organic solvent has a function of increasing adhesion of the second resin with respect to the first resin, or preventing drying of the clear ink. As the specific examples of the organic solvent, since the same organic solvent exemplified in the description of the reaction liquid can be used, the description thereof is omitted. The content of the organic solvent is not particularly limited, and for example, may be 1% by mass to 40% by mass with respect to the total mass of the coloring ink.

2.2.4. Surfactant

The clear ink according to the embodiment may contain a surfactant. The surfactant has a function of improving wettability with respect to the recording medium by decreasing the surface tension of the clear ink. Among the surfactant, for example, an acetylene glycol-based surfactant, a silicone-based surfactant, or a fluorine-based surfactant can be preferably used. As the specific examples of the surfactant, since the same surfactant exemplified in the description of the reaction liquid can be used, the description thereof is omitted. The content of the surfactant is not particularly limited, and may be 0.1% by mass to 1.5% by mass with respect to the total mass of the clear ink.

2.2.5. Other Components

The clear ink according to the embodiment, if necessary, may contain a pH adjuster, a preservative, a fungicide, an antirust agent, and a chelating agent.

2.2.6. Properties of Clear Ink

When the clear ink according to the embodiment is attached to the recording medium by the ink jet method, the surface tension at a temperature of 20° C. is preferably 20 mN/m to 40 mN/m, and more preferably 25 mN/m to 35 mN/m, from a viewpoint of taking a balance between an image quality and reliability of the ink for ink jet recording. Also, when the clear ink is attached to the recording medium by the ink jet method, from the same viewpoint, the viscosity of the clear ink at a temperature of 20° C. is preferably 3 mPa·s to 10 mPa·s, and more preferably 3 mPa·s to 8 mPa·s.

2.3. Coloring Ink

In the ink jet recording method according to the embodiment, an image is formed using the coloring ink for ink jet recording in the coloring ink attachment step. Hereinafter, components included in the coloring ink and components which may be included to be used in the coloring ink attachment step will be described.

2.3.1. Coloring Material

The coloring ink according to the embodiment contains a coloring material. As the coloring material, a pigment and an acid dye are preferably used from a viewpoint of excellent reactivity with the reactant included in the aforementioned reaction liquid.

Among the pigment, examples of the inorganic pigment include carbon black, iron oxide, and titanium oxide. The carbon black is not particularly limited, and the examples thereof include furnace black, lamp black, acetylene black, and channel black (C.I. Pigment Black 7). Also, commercially available products of the carbon black for example, No. 2300, 900, MCF88, No. 20B, No. 33, No. 40, No. 45, No. 52, MA7, MA8, MA100, No. 2200B (trade name, all of the above are manufactured by Mitsubishi Chemical Corporation), color black FW1, FW2, FW2V, FW18, FW200, 5150, S160, 5170, PRINTEX 35, U, V, 140U, special black 6, 5, 4A, 4, 250 (trade name, all of the above are manufactured by Degussa AG), Conductex SC, Raven 1255, 5750, 5250, 5000, 3500, 1255, 700 (trade name, all of the above are manufactured by Columbian Carbon Japan Ltd and Columbian Chemicals), Regal 400R, 330R, 660R, Mogul L, Monarch 700, 800, 880, 900, 1000, 1100, 1300, 1400, and Elftex 12 (trade name, all of the above are manufactured by Cabot Corporation).

Examples of the organic pigment include quinacridone-based pigment, a quinacridone quinone-based pigment, a dioxazine-based pigment, a phthalocyanine-based pigment, an anthrapyrimidine-based pigment, an anthranthrone-based pigment, an indanthrone-based pigment, a flavanthrone-based pigment, a perylene-based pigment, a diketopyrrolopyrrole-based pigment, a perinone-based pigment, a quinophthalon-based pigment, an anthraquinone-based pigment, a thioindigo-based pigment, a benzimidazolone-based pigment, an isoindoline-based pigment, an azomethine-based pigment, and an azo-based pigment. The specific examples of the organic pigment include the following.

The pigment used for a cyan ink include C.I. Pigment Blue 1, 2, 3, 15, 15:1, 15:2, 15:3, 15:4, 15:6, 15:34, 16, 18, 22, 60, 65, 66, C.I. Vat Blue 4, and 60.

The pigment used for a magenta ink include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, 264, C.I. Pigment Violet 19, 23, 32, 33, 36, 38, 43, and 50.

The pigment used for a yellow ink include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213.

In addition, examples of the pigment used for an ink having colors other than the above, such as a green ink and an orange ink include the well-known pigments. The pigment may be used alone, or two or more thereof may be used in combination.

Examples of the acid dye include an azo-based acid dye, an anthraquinone-based acid dye, a pyrazolone-based acid dye, a phthalocyanine-based acid dye, a xanthene-based acid dye, an indigoid-based acid dye, and a triphenylmethane-based acid dye. The specific examples of the acid dye include C.I. Acid Yellow 17, 23, 42, 44, 79, 142, C.I. Acid Red 52, 80, 82, 249, 254, 289, C.I. Acid Blue 9, 45, 249, C.I. Acid Black 1, 2, 24, and 94. The dye may be used alone, two or more thereof may be used in combination.

2.3.2. Resin Dispersant

When the pigment is used as the coloring material, it is preferable the pigment be stably dispersed in water and maintained, in order to apply the pigment to the coloring ink. As the method for performing the above, the following methods are exemplified: a method of dispersing the pigment in a resin dispersant such as a water-soluble resin and/or water-dispersible resin (hereinafter, the pigment treated by this method is referred to as "resin-dispersed pigment); a method of dispersing the pigment in a dispersant (hereinafter, the pigment treated by this method is referred to as "dispersant-dispersed pigment"); and a method of chemically or physically introducing a hydrophilic functional group into a pigment particle surface so as to disperse and/or dissolve the pigment in water without the resin or the dispersant (hereinafter, the pigment treated by this method is referred to as "surface-treated pigment").

The coloring ink according to the embodiment can use any of the resin-dispersed pigment, the dispersant-dispersed pigment, and the surface-treated pigment, and if necessary, a plurality of the pigments can be used in combination, but it is preferable to contain the resin-dispersed pigment.

Examples of the resin dispersant used for the resin-dispersed pigment include polyvinyl alcohols, polyacrylic acid, an acrylic acid-acrylonitrile copolymer, an vinyl acetate-acrylate copolymer, an acrylic acid-acrylate copolymer, a styrene-acrylic acid copolymer, a styrene-methacrylic acid copolymer, a styrene-methacrylic acid-acrylate copolymer, a styrene-α-methylstyrene-acrylic acid copolymer, a styrene-α-methylstyrene-acrylic acid-acrylate copolymer, a styrene-maleic acid copolymer, styrene-maleic anhydride copolymer, vinylnaphthalene-acrylic acid copolymer, a vinylnaphthalene-maleic acid copolymer, a vinyl acetate-maleate copolymer, a vinyl acetate-crotonic acid copolymer, a vinyl acetate-acrylic acid copolymer, and salts thereof. Among the above, a copolymer of a monomer having a hydrophobic functional group and a monomer having a hydrophilic functional group, and a polymer formed of a monomer having a hydrophobic functional group and a hydrophilic functional group in combination. As the type of the copolymer, any of a random copolymer, a block copolymer, an alternating copolymer, and a graft copolymer may be used.

The content ratio of the resin dispersant can be appropriately selected depending on the pigment to be dispersed, and the content ratio thereof is preferably 5 parts by mass to 200 parts by mass, and more preferably 30 parts by mass to 120 parts by mass with respect to the 100 parts by mass of the pigment content in the coloring ink.

2.3.3. Water

The coloring ink according to the embodiment contains water. Since the preferable water to be used is same as those exemplified in the description of the reaction liquid, the description thereof is omitted. The content of the water may be, for example, 50% by mass or more with respect to the total mass of the coloring ink.

2.3.4. Organic Solvent

The coloring ink according to the embodiment may contain an organic solvent. The organic solvent has a function of increasing adhesion of the coloring ink with respect to the aforementioned recording medium having low absorbability or non-absorbability, or preventing drying of the head of the ink jet recording apparatus. As the specific examples of the organic solvent, since the same organic solvent exemplified in the description of the reaction liquid can be used, the description thereof is omitted. The content of the organic solvent is not particularly limited, and for example, may be 1% by mass to 40% by mass with respect to the total mass of the coloring ink.

2.3.5. Surfactant

The coloring ink according to the embodiment may contain a surfactant. The surfactant has a function of improving wettability with respect to the recording medium by decreasing the surface tension of the coloring ink. Among the surfactant, for example, an acetylene glycol-based surfactant, a silicone-based surfactant, or a fluorine-based surfactant can be preferably used. As the specific examples of the surfactant, since the same surfactant exemplified in the description of the reaction liquid can be used, the description thereof is omitted. The content of the surfactant is not particularly limited, and may be 0.1% by mass to 1.5% by mass with respect to the total mass of the coloring ink.

2.3.6. Second Resin

The coloring ink according to the embodiment may contain a resin. The resin included in the coloring ink of the embodiment is referred to as the second resin. As the specific examples of the second resin, since the same resin as the first resin exemplified in the description of the clear ink can be used, the description thereof is omitted. When the second resin is contained, the content thereof (in terms of solid content) is preferably 1% by mass to 10% by mass, and more preferably 1% by mass to 7% by mass with respect to the total mass of the coloring ink. In addition, when the resin dispersant is used in the coloring ink, the resin dispersant may be regarded as the second resin. In this case, the second resin also functions as a dispersant of the pigment.

In addition, when the coloring ink contains the second resin, due to the interaction between the second resin and the aforementioned reactant, the viscosity of the coloring ink can be increased. According to this, fluidity of the coloring ink on the recording medium is decreased, and when there is effusion, or a plurality of types of the (respectively different colors) coloring inks are attached, it can be suppressed that these coloring inks are mutually diffused, and bleed can be further suppressed.

2.3.7. Other Components

The coloring ink according to the embodiment, if necessary, may contain a pH adjuster, a preservative, a fungicide, an antirust agent, and a chelating agent.

2.3.8. Properties of Coloring Ink

The surface tension of the coloring ink according to the embodiment at a temperature of 20° C. is preferably 20 mN/m to 40 mN/m, and more preferably 25 mN/m to 35 mN/m, from a viewpoint of taking a balance between an image quality and reliability of the ink for ink jet recording. The surface tension can be measured by for example, confirming the surface tension when a platinum plate is wetted by an ink in an environment of 20° C., using a surface tensiometer CBVP-Z (trade name, manufactured by Kyowa Interface Science Co., Ltd).

In addition, from the same viewpoint, the viscosity of the coloring ink according to the embodiment at a temperature of 20° C. is preferably 3 mPa·s to 10 mPa·s, and more preferably 3 mPa·s to 8 mPa·s. In addition, the viscosity can be measured in an environment of 20° C., for example, using viscoelastic testing machine MCR-300 (trade name, manufactured by Pysica).

In addition, when the second resin is blended in the coloring ink, the second resin may be the same resin as the first resin included in the clear ink. When the second resin is the same resin as the first resin, affinity of the both resins is increased, and for example, adhesiveness of the first resin and second resin with respect to the recording medium is increased. Also, due to the first resin and second resin, it is possible to increase an effect of enveloping and fixing the coloring material of the coloring ink. According to this effect, when the second resin is the same resin as the first resin, abrasion resistance or wet abrasion resistance of the image can be increased. Here, the same resin refers to the same kind of resin in the classification of the resin, such as the aforementioned urethane-based resin, the acrylic resin, and the fluorene-based resin.

3. Ink Jet Recording Apparatus

An ink jet recording apparatus according to the embodiment relatively moves with respect to the recording medium, and includes a recording head discharging the reaction liquid including the reactant for aggregating or thickening the coloring ink component including the coloring material, the coloring ink, and the clear ink including the first resin. In addition, after the reaction liquid is attached to the recording medium, in a state where the residual rate of the volatile component of the reaction liquid attached to the recording medium is 25% by mass or more, the coloring ink is attached to the area where the reaction liquid is attached, and the clear ink is attached to the area where the coloring ink is attached.

As an example of the ink jet recording apparatus of the embodiment, the ink jet recording apparatus used in the coloring ink attachment step described in the item of "1.3. Coloring ink attachment step" can be exemplified, and appropriately, an apparatus configured to discharge the aforementioned reaction liquid, coloring ink, and clear ink from the nozzles can be exemplified.

Hereinafter, one example of the ink jet recording apparatus which can implement the ink jet recording method according to the embodiment will be described simply with reference to the drawing. In addition, the ink jet recording apparatus which can be used for the ink jet recording method according to the embodiment is not limited to the following aspect. In other words, in the following aspect, all of the steps are performed continuously as one line (in-line), but the respective steps may not be implemented as in-line, but may be performed intermittently.

FIGURE is a diagram schematically illustrating an ink jet recording apparatus which can implement the method for recording an image according to the embodiment. The ink jet recording apparatus 1000 according to the embodiment includes a transportation unit 10 transporting the recording medium 1, as a recording unit 20, a recording head 22 relatively moving with respect to the recording medium 1 and attaching the reaction liquid to the recording medium 1, recording head 24 relatively moving with respect to the recording medium 1 and attaching the coloring ink to the recording medium 1, and recording head 26 relatively moving with respect to the recording medium 1 and attaching the clear ink to the recording medium 1.

3.1. Transportation Unit

The transportation unit 10 can be configured by, for example, a roller 11. The transportation unit 10 may have a plurality of rollers 11. The transportation unit 10 is provided, in the illustrated example, on the upstream side than the recording unit 20 in a direction in which the recording medium 1 is transported (indicated by an arrow in the drawing). However, the transportation unit is not limited thereto, and as long as the recording medium 1 can be transported, the position or the number of the transportation unit to be provided is arbitrary. The transportation unit 10 may include a paper feeding roll, a paper feeding tray, a paper discharging roll, a paper discharging tray, and various platens.

The recording medium 1 transported by the transportation unit 10 is transported to the position where respective liquids are attached by the recording unit 20. In addition, in FIGURE, a case where the recording medium 1 is a continuous sheet is exemplified, but even if the recording medium 1 is a cut sheet, it is possible to transport the aforementioned recording medium by appropriately configuring the transportation unit 10.

3.2. Recording Unit

The ink jet recording apparatus 1000 of the embodiment has recording heads 22, 24, and 26 as the recording unit 20. The recording head 22 attaches the reaction liquid on a predetermined area of the recording medium 1. The recording head 24 attaches the coloring ink on a predetermined area of the recording medium 1 where the reaction liquid is attached. In addition, the recording head 26 attaches the clear ink on a predetermined area of the recording medium 1 where the coloring ink is attached. In addition, in FIGURE, as the recording unit 20, a case where the ink jet method is used is exemplified. However, the recording unit is not limited thereto, and may be changed to an aspect that can implement the aforementioned method (for example, spray coating or roll coating).

In addition, the reaction liquid attached to the recording medium 1 (not illustrated) may be dried by a drying unit (not illustrated). The drying unit is preferably disposed on the downstream side of the recording head 22 and the upstream side of the recording head 24 in a transportation direction of the recording medium 1, but the position or the number of the drying unit to be disposed is arbitrary. The drying unit is not particularly limited, if the unit includes a configuration in which evaporation or dispersion of the volatile component of the liquid is promoted, and the examples thereof include a unit for adding heat to the recording medium 1, a unit for blowing air to the liquid, and further a combination unit thereof. Specifically, forced-air heating, radiation heating, conduction heating, high frequency drying, or microwave drying is preferably used.

In a case where natural drying is performed, the ink jet recording apparatus 1000 according to the embodiment may not include a drying unit. In addition, a unit for drying the liquid attached on the recording medium 1 may be provided to the corresponding position interposed between the recording heads 22, 24, and 26 of the recording unit 20 and the recording medium 1, may be provided on the downstream side of the respective heads, or may be provided to both of these positions.

For the recording unit 20, all of the ink jet recording apparatus including a serial type recording head, and the ink jet recording apparatus including a line type recording head can be used.

The ink jet recording apparatus including a serial type recording head performs recording by performing scanning (pass) a plurality of times, in which the scanning is to discharge a liquid composition while the recording head is relatively moved with respect to the recording medium. As a specific example of the serial type recording head, the head is exemplified, in which the recording head is mounted on a carriage which moves in a width direction (direction intersecting the transportation direction of the recording medium) of the recording medium, and droplets are discharged on the recording medium as the recording head is moved along the movement of the carriage.

Meanwhile, the ink jet recording apparatus including a line-type recording head performs recording by performing scanning (pass) one time, in which the scanning is to discharge a liquid composition while the recording head is relatively moved with respect to the recording medium. As a specific example of the line type recording head, the head is exemplified, in which the recording head is formed wider than the width of the recording medium, and droplets are discharged on the recording medium without the recording head being moved.

In the serial type recording head, since the image is recorded by a plurality of passes, until the final pass is performed, the time for drying the droplets discharged by the previous pass of the final pass can be secured. In contrast, in the line type recording head, since all of the droplets necessary for recording are attached to the recording medium by one pass, the time for drying the droplets are short, compared to a case where the serial type recording head is used. Therefore, in the ink jet recording method according to the embodiment, it is possible to obtain a higher effect.

As such, in one aspect of the embodiment, it is possible to cause the reaction liquid, coloring ink, and clear ink to have properties suitable for the ink jet recording, and if these liquids are respectively introduced to an ink cartridge of the ink jet recording apparatus, it is possible to easily implement the ink jet recording method according to the embodiment.

According to the ink jet recording apparatus, it is possible to stably record an image, in which color developing properties and fixability are excellent, and printing unevenness is suppressed, on the recording medium. That is, according to the ink jet recording apparatus, it is possible to form an image in which color developing properties are excellent because the coloring ink is in contact with the reaction liquid including a large amount of the volatile components to aggregate the coloring material in a granular shape, and fixability of the aggregate thereof with respect to the recording medium is excellent due to the first resin of the clear ink.

4. Ink Set

The ink set of the embodiment includes the reaction liquid including the reactant for aggregating or thickening the coloring ink component including the aforementioned coloring material, the coloring ink, and the clear ink including the first resin. The ink set of the embodiment may include, in addition to this configuration, other liquid compositions. Also, the reaction liquid, and the clear ink of the ink set of the embodiment do not necessarily have properties which can be used in the ink jet recording apparatus. In other words, the reaction liquid and the clear ink may have properties appropriate for spin coating, spray coating, gravure roll coating, reverse roll coating, and bar coating. Accordingly, the ink set of the embodiment is a set of liquids which can be used in the aforementioned ink jet recording method, and may be packaged in any types of set.

5. Examples

Hereinafter, the invention will be further described by showing Examples and Comparative Examples, but the invention is not limited to the following examples.

5.1. Preparation of Reaction Liquid

Each of the components were mixed and stirred so as to have the blending ratio shown in Table 1, and then the resultant were filtrated by a 10 μm membrane filter, thereby preparing the reaction liquid. The numerical values shown in Table 1 all indicate % by mass, ion exchanged water was added to the reaction liquid d such that the total mass of the reaction liquid is 100% by mass. The each of the reaction liquids shown in Table 1 includes magnesium sulfate (multivalent metal salt), maleic acid (organic acid), or sodium sulfate (inorganic acid metal salt) as the reactant.

In addition, the components described as the component name in Table 1 were prepared as a reagent, and the components described as other than the compound name were prepared as follows.

BYK-348 (trade name, manufactured by BYK Japan K.K., silicone-based surfactant)

TABLE 1

| Composition of reaction liquid | Components | Reaction liquid 1 | Reaction liquid 2 | Reaction liquid 3 |
|---|---|---|---|---|
| Reactant | Magnesium sulfate | 5 | — | — |
|  | Maleic acid | — | 5 | — |
|  | Sodium sulfate | — | — | 5 |
| Organic solvent | 1,2-hexanediol | 5 | 5 | 5 |
|  | Propylene glycol | 20 | 20 | 20 |
| Surfactant | BYK348 | 1 | 1 | 1 |
| Balance | Water | Residual amount | Residual amount | Residual amount |
|  | Total | 100 | 100 | 100 |

5.2. Preparation of Coloring Ink

Each of the components were mixed and stirred so as to have the blending ratio shown in Table 2, and then the resultant were filtrated by a 10 μm membrane filter, thereby preparing the coloring ink. When preparing the coloring ink, a pigment dispersion containing a pigment, a resin dispersant, and water was created in advance, and the pigment dispersion and the remaining components were mixed. The numerical values shown in Table 2 all indicate % by mass, and ion exchanged water was added to the coloring ink such that the total mass of the coloring ink is 100% by mass. In addition, C.I. Pigment Blue 15:3 (cyan pigment) was used as the pigment. In addition, each of the coloring ink shown in Table 2 includes substances shown in Table as the second resin. Each of the resins is as follows. In all of the Tables, a solid content component is based on the mass of the solid content.

VINIBLAN 2586 (trade name, manufactured by Nissin Chemical Co., Ltd., water-based styrene-acrylic resin emulsion)

D4200 (trade name: RESAMINE D-4200, manufactured by Dainichiseika Color&Chemicals Mfg. Co., Ltd., water-based urethane emulsion)

TABLE 2

| Composition of coloring ink | Components | Coloring ink 1 | Coloring ink 2 |
|---|---|---|---|
| Pigment | PB15:3 | 5 | 5 |
| Second resin | VINIBLAN 2586 | 5 | — |
|  | D4200 | — | 5 |
| Organic solvent | 1,2-hexanediol | 5 | 5 |
|  | Propylene glycol | 20 | 20 |
| Surfactant | BYK348 | 1 | 1 |
| Balance | Water | Residual amount | Residual amount |
|  | Total | 100 | 100 |

5.3. Preparation of Clear Ink

Each of the components were mixed and stirred so as to have the blending ratio shown in Table 3, and then the resultant were filtrated by a 10 μm membrane filter, thereby preparing the clear ink. The numerical values shown in Table 3 all indicate % by mass, and ion exchanged water was added to the clear ink such that the total mass of the clear ink is 100% by mass. In addition, each of the clear inks shown in Table 3 includes substances in Table as the second resin.

TABLE 3

| Composition of clear ink | Components | Clear ink 1 | Clear ink 2 |
|---|---|---|---|
| First resin | VINIBLAN 2586 | 15 | — |
|  | D4200 | — | 5 |
| Organic solvent | 1,2-hexanediol | 5 | 5 |
|  | Propylene glycol | 20 | 20 |
| Surfactant | BYK348 | 1 | 1 |
| Balance | Water | Residual amount | Residual amount |
|  | Total | 100 | 100 |

5.4. Recording Medium

In addition, in the following evaluation tests, a polypropylene film (trade name "SY51M", manufactured by UPM RAFLATAC) was used as the recording medium having non-absorbability.

5.5. Creation of Recorded Matter

A creation condition and evaluation result of Examples and Comparative Examples are shown in Tables 4 and 5. In each example, the modified device of the ink jet printer PX-G930 (manufactured by Seiko Epson Corp.) was filled with the reaction liquid, coloring ink, and clear ink prepared as above so as to be 1 nozzle row/1 droplet. The nozzle density of the nozzle row in the recording head of the printer was 300 dpi. The recording medium was set and coated with the reaction liquid in an attachment amount of shown in Tables 4 and 5. The pattern was a solid pattern of 10 cm×10 cm. After the attachment, the recording medium was set back, the coloring ink was overlapped thereon in the same pattern in an attachment amount of 7 mg/inch², thereby completing the printing.

After that, the recording medium was set back, and the clear ink was attached thereto by overlapping in the same pattern in a coating amount shown in Tables 4 and 5. The dot resolution of the printing was 1200×1200 dpi in all of the reaction liquid, coloring ink, and clear ink. After that, the recording medium was dried by heating in an oven at a temperature of 60° C. for 10 minutes.

In addition, the printer was configured such that the recording medium can be heated during recording, by mounting a heater on a platen.

Tables 4 and 5 also show that whether the drying step of the reaction liquid was performed or not. The examples without the drying step are the examples in which the recording medium was set back immediately after the attachment of the reaction liquid, without operating the heater. The surface temperature of the recording medium during recording was set to 25° C., and the residual rate of volatile component of the reaction liquid at the time of printing the coloring ink was set to 90%. However, in Example 6 in which the residual rate is 50%, the residual rate was set to 50% after the reaction liquid was attached to be left alone at room temperature. In Example in which the residual rate is 90%, the time from the completion of the attachment of the reaction liquid to the start of the attachment of the coloring ink was within 5 seconds, in Example 6 in which the residual rate is 50%, the time from the completion of the attachment of the reaction liquid to the start of the attachment of the coloring ink was within seconds, and in all of the Examples, the surface temperature of the recording medium during the attachment steps was 25° C. Also, in Example 11 in which the residual rate is 30%, the time from the completion of the attachment of the reaction liquid to the start of the attachment of the coloring ink was set to within 25 seconds, and the surface temperature of the recording medium during the attachment steps was set to 50° C. In Comparative Examples 1 and 4 in which the residual rate is 20%, the time from the completion of the attachment of the reaction liquid to the start of the attachment of the coloring ink was set to 25 seconds, and the surface temperature of the recording medium during the attachment steps was set to 55° C.

In addition, in Example 10 and Comparative Example 5 in which the drying step is included, printing was performed by operating the heater to set the surface temperature of the recording medium to 45° C. The time from the completion of the attachment of the reaction liquid to the start of the attachment of the coloring ink was 25 seconds. After the reaction liquid is printed, the residual rate of the volatile component of the reaction liquid was shown in tables.

5.6. Evaluation Tests 5.6.1. Fixability (Abrasion Resistance)

Fixability of the image was evaluated by an abrasion test using a cloth. The abrasion resistance was evaluated using a color fastness rubbing tester AB-301 (trade name, manufactured by TESTER SANGYO CO., LTD.). Specifically, the surface of the recording medium having an image recorded thereon was rubbed with a friction block having a white cloth (JIS L 0803 standard) attached thereto, until the coating film is peed off by adding a load of 300 g or 30 times in a reciprocating manner. Then, the state where the image (coating film) on the surface of the recording medium was peed off was visually observed. The evaluation standard is as follows.

AA: The coating film was not peed off, even when the surface was rubbed 30 times in a reciprocating manner.

A: The coating film was peed off, when the surface was rubbed 20 to 29 times in a reciprocating manner.

B: The coating film was peed off, when the surface was rubbed 15 to 19 times in a reciprocating manner.

C: The coating film was peed off, when the surface was rubbed 10 to 14 times in a reciprocating manner.

D: The coating film was peed off, when the surface was rubbed within 9 times in a reciprocating manner.

5.6.2. Image Quality

In each example, a solid pattern recorded on the surface of the sample recording medium was visually observed, and the presence of printing unevenness (solid filling) was determined. The evaluation standard is as follows.

A: Non-uniform density of the ink within the pattern was not observed.

B: Non-uniform density was slightly recognized.

D: Non-uniform density was largely recognized.

5.6.3. Printing Stability 1

In the same manner as the fixability evaluation, the solid pattern was printed on 300 pieces of A4PPC paper. A nozzle test of the coloring ink was performed with respect to a nozzle row (300 nozzles) for each time when 50 pieces of papers were printed. According to the following evaluation standard, printing stability was evaluated and the result is shown in Table.

B: There was no nozzle incapable of discharging the ink.

D: There was a nozzle incapable of discharging the ink (occurrence of nozzle omission), but the part where the coloring ink was not attached, resulting from not discharging the coloring ink, was not outstanding in the pattern (the number of nozzles incapable of discharging the ink was less than 15% with respect to the entirety of the nozzles).

DD: There was a nozzle incapable of discharging the ink (occurrence of nozzle omission), but the part where the coloring ink was not attached, resulting from not discharging the coloring ink, was outstanding in the pattern (the number of nozzles incapable of discharging the ink was 15% or more with respect to the entirety of the nozzles).

5.6.4. Printing Stability 2

In the same manner as the fixability evaluation, the solid pattern was printed on 300 pieces of A4PPC paper. A nozzle test of the clear ink was performed with respect to a nozzle row (300 nozzles) for each time when 50 pieces of papers were printed. According to the following evaluation standard, printing stability was evaluated and the result is shown in Table.

B: There was no nozzle incapable of discharging the ink.

D: There was a nozzle incapable of discharging the ink (occurrence of nozzle omission), but the part where glossiness is poor, resulting from not discharging the clear ink, was not outstanding in the pattern (the number of nozzles incapable of discharging the ink was less than 15% with respect to the entirety of the nozzles).

DD: There was a nozzle incapable of discharging the ink (occurrence of nozzle omission), but the part where glossiness is poor, resulting from not discharging the clear ink, was outstanding in the pattern (the number of nozzles incapable of discharging the ink was 15% or more with respect to the entirety of the nozzles).

5.7. Evaluation Results

The results of the evaluation tests are shown in Tables 4 and 5.

TABLE 4

|  | Example 1 | Example 2 | Example 3 | Example 4 | Example 5 | Example 6 |
|---|---|---|---|---|---|---|
| Type of reaction liquid | Reaction liquid 1 | Reaction liquid 1 | Reaction liquid 1 | Reaction liquid 2 | Reaction liquid 3 | Reaction liquid 1 |
| Attachment amount of reaction liquid [mg/inch$^2$] | 0.5 | 0.5 | 0.5 | 0.5 | 0.5 | 0.5 |
| Whether to include heating step of reaction liquid or not | No | No | No | No | No | No |
| Residual amount of volatile component of reaction liquid [%] | 90 | 90 | 90 | 90 | 90 | 50 |
| Type of coloring ink | Coloring ink 1 | Coloring ink 1 | Coloring ink 2 | Coloring ink 1 | Coloring ink 1 | Coloring ink 1 |
| Type of clear ink | Clear ink 1 | Clear ink 2 | Clear ink 2 | Clear ink 1 | Clear ink 1 | Clear ink 2 |
| Attachment amount of clear liquid [mg/inch$^2$] | 1.0 | 1.0 | 1.0 | 1.0 | 1.0 | 1.0 |
| Fixability | A | B | A | A | A | A |
| Image quality | A | A | A | B | B | A |
| Printing stability | B | B | B | B | B | B |
| Printing stability (clear ink) | B | B | B | B | B | B |

TABLE 5

|  | Example 7 | Example 8 | Example 9 | Example 10 | Example 11 |
|---|---|---|---|---|---|
| Type of reaction liquid | Reaction liquid 1 | Reaction liquid 1 | Reaction liquid 1 | Reaction liquid 1 | Reaction liquid 1 |
| Attachment amount of reaction liquid [mg/inch$^2$] | 0.2 | 0.5 | 0.5 | 0.5 | 0.5 |
| Whether to include heating step of reaction liquid or not | No | No | No | Yes | Yes |
| Residual amount of volatile component of reaction liquid [%] | 90 | 90 | 90 | 45 | 30 |
| Type of coloring ink | Coloring ink 1 | Coloring ink 1 | Coloring ink 1 | Coloring ink 1 | Coloring ink 1 |
| Type of clear ink | Clear ink 2 | Clear ink 1 | Clear ink 1 | Clear ink 1 | Clear ink 1 |
| Attachment amount of clear liquid [mg/inch$^2$] | 1 | 0.4 | 2.5 | 1 | 1 |

TABLE 5-continued

| Fixability | A | B | A | AA | AA |
|---|---|---|---|---|---|
| Image quality | B | A | B | A | B |
| Printing stability | B | B | B | D | D |
| Printing stability (clear ink) | B | B | B | B | D |

|  | Comparative Example 1 | Comparative Example 2 | Comparative Example 3 | Comparative Example 4 | Comparative Example 5 |
|---|---|---|---|---|---|
| Type of reaction liquid | Reaction liquid 1 | Reaction liquid 1 | — | Reaction liquid 1 | Reaction liquid 1 |
| Attachment amount of reaction liquid [mg/inch$^2$] | 0.5 | 0.5 | — | 0.5 | 0.5 |
| Whether to include heating step of reaction liquid or not | Yes | No | — | Yes | Yes |
| Residual amount of volatile component of reaction liquid [%] | 20 | 90 | — | 20 | 45 |
| Type of coloring ink | Coloring ink 1 | Coloring ink 1 | Coloring ink 1 | Coloring ink 1 | Coloring ink 1 |
| Type of clear ink | Clear ink 1 | — | Clear ink 1 | — | — |
| Attachment amount of clear liquid [mg/inch$^2$] | 1 | — | 1 | — | — |
| Fixability | AA | D | A | A | C |
| Image quality | D | A | D | D | A |
| Printing stability | DD | B | B | DD | D |
| Printing stability (clear ink) | DD | — | B | — | — |

In all of the Examples 1 to 9, the fixability, image quality, and printing stability were excellent, and in the Examples 10 and 11, the printing stability was slightly decreased, but the considerably excellent fixability and image quality were obtained. In contrast, in all of the Comparative Examples 1 and 4, the image quality and printing stability were insufficient. Further, in the Comparative Example 2 in which the clear ink was not used, the fixability was poor, and in Comparative Example 3 in which the reaction liquid was not used, the image quality was insufficient. In addition, in the Comparative Example 5, the fixability and printing stability were decreased, but the image quality was maintained as excellent.

Also, at least the following was determined from the results in Tables 4 and 5.

(1) From the Examples 1 and 2, when the clear ink including the styrene acrylic first resin is used, the more excellent abrasion resistance is obtained.

(2) From the Examples 3 to 5, when the second resin of the coloring ink and the first resin of the clear ink are the same as each other, there is a tendency that the fixability becomes excellent.

(3) From the Examples 1, 4, and 5, all of the reactants are effective, but the multivalent metal salt is particularly excellent.

(4) From the Examples 2 and 6, the fixability is improved by drying the reaction liquid, but the recording time are lengthened.

(5) From the Examples 2 and 7, when a small amount of the reaction liquid is used, the image quality is slightly deteriorated, but the fixability is improved.

(6) From the Examples 1, 7, 8, and 9, the amount of the clear ink affects balance between the fixability and image quality.

(7) From the Comparative Example 1, when the reaction liquid is dried strongly, the fixability is improved, but the recording head is negatively influenced by heat caused by the heater, and the printing stability of the clear ink becomes poor.

(8) From the Comparative Example 2, when the clear ink is not used, the fixability becomes insufficient.

(9) From the Comparative Example 3, when the reaction liquid is not used, the fixability becomes excellent, but the image quality becomes insufficient.

(10) From the Comparative Example 4, when the reaction liquid is dried strongly, the fixability is improved, but the recording head is negatively influenced by heat caused by the heater.

(11) From the Comparative Example 5, when the reaction liquid is dried, the recording head is negatively influenced by the heater, but the fixability can be secured even if the clear ink is not used.

(12) From Example 10 and Example 11, when the reaction liquid is dried appropriately, the fixability becomes considerably excellent.

(13) From Example 10 and Example 11, as the clear ink does not contain the pigment, the clear ink is difficult to be clogged than the coloring ink, and in contrast, deterioration of glossiness of the pattern becomes outstanding when there is a discharge failure.

In addition, in the aforementioned respective examples, a serial printer was used, but it is apparent that a line printer may be used in the invention. In a case of the line printer, for example, the printer may include a line head for attaching the reaction liquid, a line head for attaching the coloring ink, and a line head for attaching the clear ink, and each of the inks may be attached (coated) to the recording medium to be transported. In a case of the line printer, the recording speed is particularly high, and the embodiment is particularly advantageous.

The present invention is not limited to the aforementioned embodiment, and further can be modified variously. For example, the invention includes the substantially same configuration (for example, a configuration of which a function, method, and result are the same, or a configuration of which a purpose and result are the same) as the configuration stated in the embodiment. In addition, the invention includes a configuration of which a non-essential part stated in the embodiment is substituted. In addition, the invention includes a configuration exhibiting the same effect, or a configuration capable of achieving the same purpose stated in the embodiment. In addition, the invention includes a configuration in which the well-known technology is added to the configuration stated in the embodiment.

The entire disclosure of Japanese Patent Application No. 2015-038292, filed Feb. 27, 2015 and 2015-075129, filed Apr. 1, 2015 and 2015-135870, filed Jul. 7, 2015 are expressly incorporated by reference herein.

What is claimed is:

1. An ink jet recording method comprising:
   attaching a reaction liquid including a reactant for aggregating or thickening a coloring ink component including a coloring material to a recording medium;
   attaching the coloring ink by an ink jet method to an area where the reaction liquid is attached, in a state where a residual rate of a volatile component of the reaction liquid attached on the recording medium is 25% by mass or more; and
   attaching a clear ink including a resin to the area where the reaction liquid is attached, after the attaching of the coloring ink, or at the same time of the attaching of the coloring ink,
   wherein the surface temperature of the recording medium between the attaching of the reaction liquid and the attaching of the coloring ink is 38° C. or lower, and the attaching of the coloring ink is started within 30 seconds after the attaching of the reaction liquid to the recording medium is completed.

2. The ink jet recording method according to claim 1, wherein the recording medium is a recording medium having low absorbability or a recording medium having non-absorbability.

3. The ink jet recording method according to claim 1, wherein the coloring ink is a water-based coloring ink including a resin.

4. The ink jet recording method according to claim 3, wherein the resin included in the clear ink and the resin included in the coloring ink are the same as each other.

5. The ink jet recording method according to claim 1, wherein the content of the resin included in the clear ink is 2% by mass to 20% by mass.

6. An ink set used for the ink jet recording method according to claim 1, the ink set comprising:
   the reaction liquid;
   the coloring ink; and
   the clear ink.

7. The ink set according to claim 6, wherein the coloring ink is a water-based coloring ink including a resin.

8. The ink set according to claim 6, wherein a content of the resin included in the clear ink is 2% by mass to 20% by mass.

9. An ink jet recording method comprising:
   attaching a reaction liquid including a reactant for aggregating or thickening a coloring ink component including a coloring material to a recording medium;
   attaching the coloring ink by an ink jet method to an area where the reaction liquid is attached, in a state where a residual rate of a volatile component of the reaction liquid attached on the recording medium is 25% by mass or more; and
   attaching a clear ink including a resin to the area where the reaction liquid is attached, after the attaching of the coloring ink, or at the same time of the attaching of the coloring ink,
   wherein the attaching of the reaction liquid includes the attaching of the reaction liquid in which the attachment amount of the reactant included in the reaction liquid in the area where the reaction liquid is attached is 0.01 mg/inch$^2$ to 0.2 mg/inch$^2$.

10. The ink jet recording method according to claim 9, wherein the recording medium is a recording medium having low absorbability or a recording medium having non-absorbability.

11. The ink jet recording method according to claim 9, wherein the coloring ink is a water-based coloring ink including a resin.

12. The ink jet recording method according to claim 11, wherein the resin included in the clear ink and the resin included in the coloring ink are the same as each other.

13. The ink jet recording method according to claim 9, wherein the content of the resin included in the clear ink is 2% by mass to 20% by mass.

14. An ink set used for the ink jet recording method according to claim 9, the ink set comprising:
   the reaction liquid;
   the coloring ink; and
   the clear ink.

15. An ink jet recording method comprising:
   attaching a reaction liquid including a reactant for aggregating or thickening a coloring ink component including a coloring material to a recording medium;
   attaching the coloring ink by an ink jet method to an area where the reaction liquid is attached, in a state where a residual rate of a volatile component of the reaction liquid attached on the recording medium is 25% by mass or more; and
   attaching a clear ink including a resin to the area where the reaction liquid is attached, after the attaching of the coloring ink, or at the same time of the attaching of the coloring ink,
   wherein the attaching of the clear ink includes the attaching of the clear ink in which the attachment amount of the clear ink in the area where the clear ink is attached is 0.5 mg/inch$^2$ to 3 mg/inch$^2$.

16. The ink jet recording method according to claim 15, wherein the recording medium is a recording medium having low absorbability or a recording medium having non-absorbability.

17. The ink jet recording method according to claim 15, wherein the coloring ink is a water-based coloring ink including a resin.

18. The ink jet recording method according to claim 17, wherein the resin included in the clear ink and the resin included in the coloring ink are the same as each other.

19. The ink jet recording method according to claim 15, wherein the content of the resin included in the clear ink is 2% by mass to 20% by mass.

20. An ink set used for the ink jet recording method according to claim 15, the ink set comprising:
   the reaction liquid;
   the coloring ink; and
   the clear ink.

* * * * *